Sept. 5, 1950  A. C. SPROAT  2,521,313
COMBINED SPRAYING AND COMPRESSOR UNIT
Filed Aug. 21, 1946  2 Sheets-Sheet 1

Arleigh C. Sproat INVENTOR.

BY

Arleigh C. Sproat INVENTOR

Patented Sept. 5, 1950

2,521,313

UNITED STATES PATENT OFFICE 2,521,313

COMBINED SPRAYING AND COMPRESSOR UNIT

Arleigh C. Sproat, Mercer, Pa., assignor to Jerry C. Stokes, Erie, and Clayton T. Sheasley, Ben Avon, Pa.

Application August 21, 1946, Serial No. 691,965

3 Claims. (Cl. 230—235)

This invention relates generally to combined spraying and compressor units and it relates more particularly to a portable unitary combined sprayer and compressor unit.

Conventional spraying units of the portable type now have cumbersome, top-heavy, unbalanced structures which have made it impossible for one man to handle a unit. Portable spraying units have not been heretofore provided which may be utilized to provide air under pressure.

It is, accordingly, an object of my invention to overcome the above and other defects in a portable combined spraying and compressor unit and it is more particularly an object of my invention to provide a combined sprayer and compressor unit which is simple in construction, economical in cost, economical in manufacture and efficient in operation.

Another object of my invention is to provide a portable unitary combined compressor and sprayer unit structure which has the center of gravity a minimum height from the ground and well forward of the center.

Another object of my invention is to provide a portable combined sprayed and compressor unit which is in balance.

Another object of my invention is to provide a combined sprayer and compressor unit in which the tank forms a part of the unitary structure.

Other objects of my invention will become evident from the following detailed description taken in conjunction with the accompanying drawings, in which.

Figure 1:
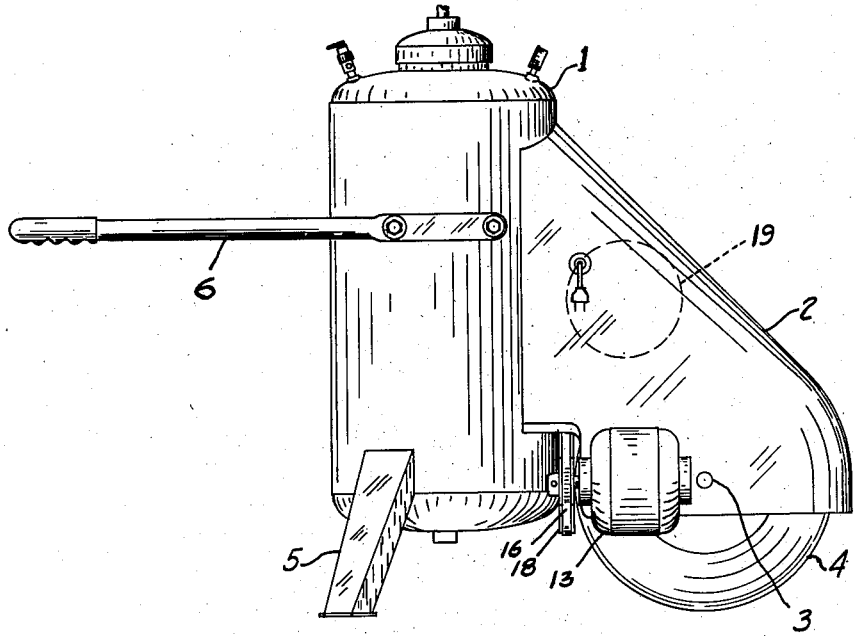
Fig. 1 is a side elevational view of my novel portable combined sprayer and compressor unit.
Figure 2:
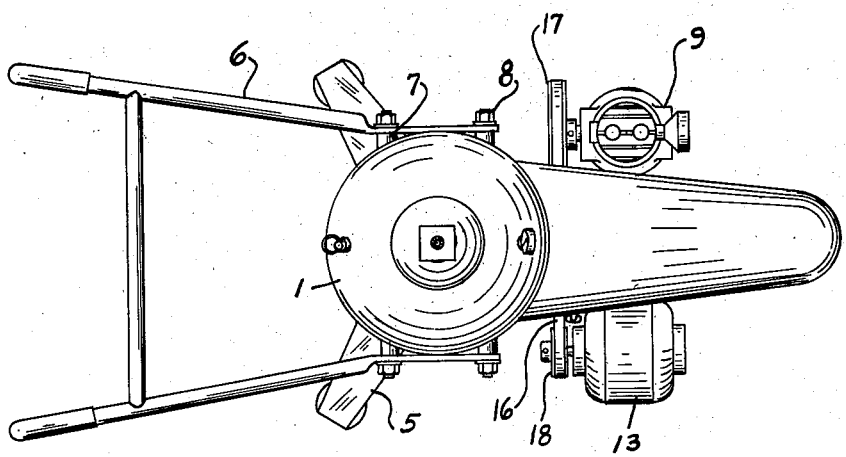
Fig. 2 is a plan view of my novel portable combined sprayer and compressor unit.
Figure 3:
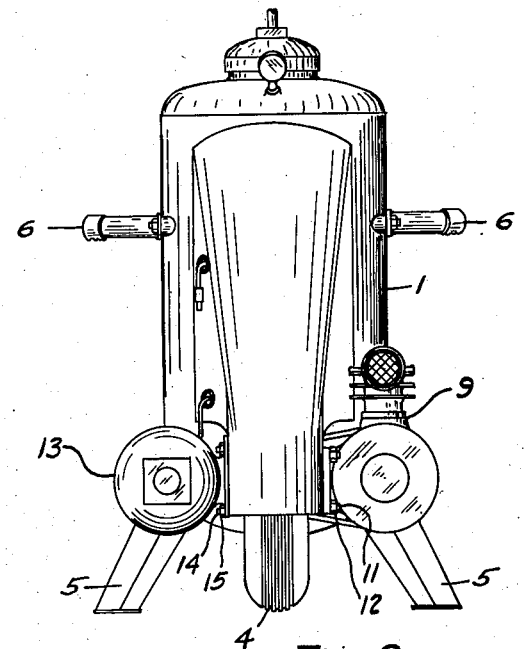
Fig. 3 is a front elevational view of my novel portable combined sprayer and compressor unit; and, Fig. 4 is a side elevational view of a modified portable combined sprayer and compressor unit in which the prime mover is a gasoline motor.

Referring now to the drawings, Figs. 1, 2 and 3 show an upright cylindrical tank 1 having a forwardly extending generally U-shaped apron or frame 2 in which is disposed a shaft 3 having mounted thereon a tired wheel 4. The tank 1 has two legs 5 extending downwardly therefrom to form 3 point contact with the ground including the wheel 4. Detachable handles 6 are attached to internally threaded bosses 7 extending laterally from the tank 1 and are secured thereto by threaded nuts 8. It will be evident that suitable handles may be secured to the tank 1 in any suitable manner. A compressor unit 9 is attached to one side of the frame 2 by outwardly extending studs 11 and nuts 12. An electric motor 13 is attached to the opposite side of the frame 2 by studs 14 and nuts 15. A belt 16 passes over pulley members 17 and 18 on the compressor unit 9 and motor 13 respectively. A reel 19 is preferably disposed in the frame 2 to reel an electric wire 20 for the electric motor 13.

Any other suitable means may be used other than a belt to transmit force from the motor to the compressor.

It will be noted that the center of gravity of my novel unit is extremely low and well forward and when the handles 6 are lifted most of the weight is placed on the shaft 3 in the frame 2. The handles 6 may be removed at any time when it is desired to ship my novel portable sprayer and compressor unit or when it is desired to store same.

Tank 1 is utilized as a reservoir for compressor air to inflate tractor tires, etc. and and as a container for spraying fluid when it is desired for spraying. This unit may be pushed between narrow rows of plants by one man. The tank may be made comparatively large because of the unitary balanced nature of my unit and still be handled by one man.

Figure 4:
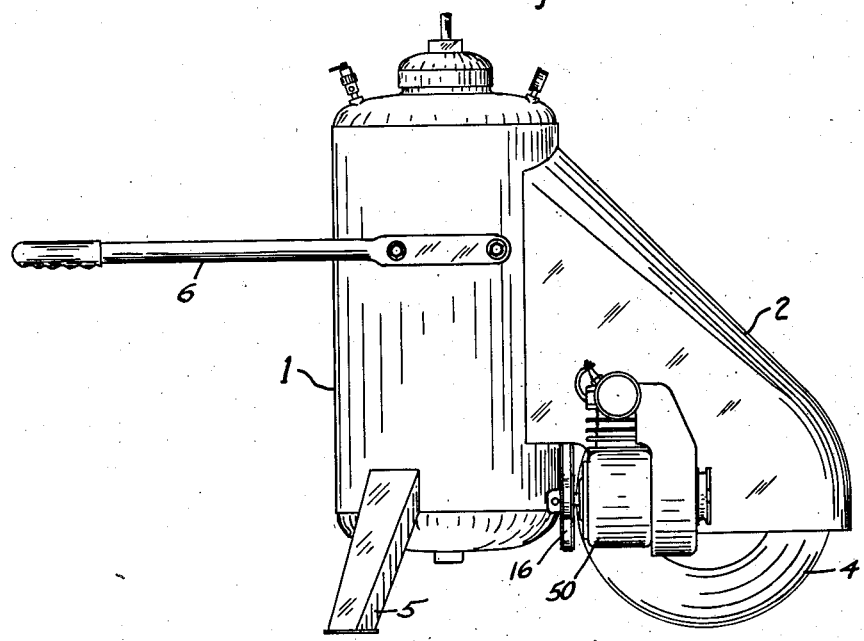

Fig. 4 shows a balanced combined spacer and compressor unit of the same construction as the unit shown in Figs. 1, 2 and 3 except that an internal combustion motor 50 is shown attached to the frame 2 in place of the electric motor 13 shown in Figs. 1, 2 and 3.

Various changes may be made in the specific embodiment of my present invention without departing from the spirit thereof and from the scope of the appended claims.

What I claim is:

1. A portable unit of the type described comprising a vertically extending cylindrical tank for holding compressed air or spraying material, an inclined curved frame substantially the height of said tank extending outwardly from and secured to said tank, a transverse shaft disposed in the lower portion of said frame in substantial horizontal alignment with the bottom of said tank, a wheel mounted on said shaft, a compressor unit mounted on one side of said frame and a motor mounted on the opposite side of said frame adjacent said shaft in balanced relationship, means for transmitting rotative force from said motor to said compressor, legs depending from said tank, and detachable handles on said tank for lifting the legs thereof from the ground and pushing said unit on said wheel.

2. A portable unit as set forth in claim 1 wherein said motor and compressor have shafts, pulleys mounted on said shafts, and a flexible member engaging said pulleys disposed crosswise of said frame.

3. A portable unit as set forth in claim 1 wherein said motor is electric and a reel is disposed centrally in said frame for reeling an electric wire for obtaining electrical energy for said motor.

ARLEIGH C. SPROAT.

REFERENCES CITED

The following references are of record in the file of this patent:

UNITED STATES PATENTS

| Number    | Name      | Date          |
|-----------|-----------|---------------|
| 1,756,806 | Beach     | Apr. 29, 1930 |
| 1,888,258 | Bettinger | Nov. 22, 1932 |
| 2,136,098 | Browne    | Nov. 8, 1938  |
| 2,227,222 | Henderson | Dec. 31, 1940 |
| 2,231,229 | Spring    | Feb. 11, 1941 |